United States Patent Office.

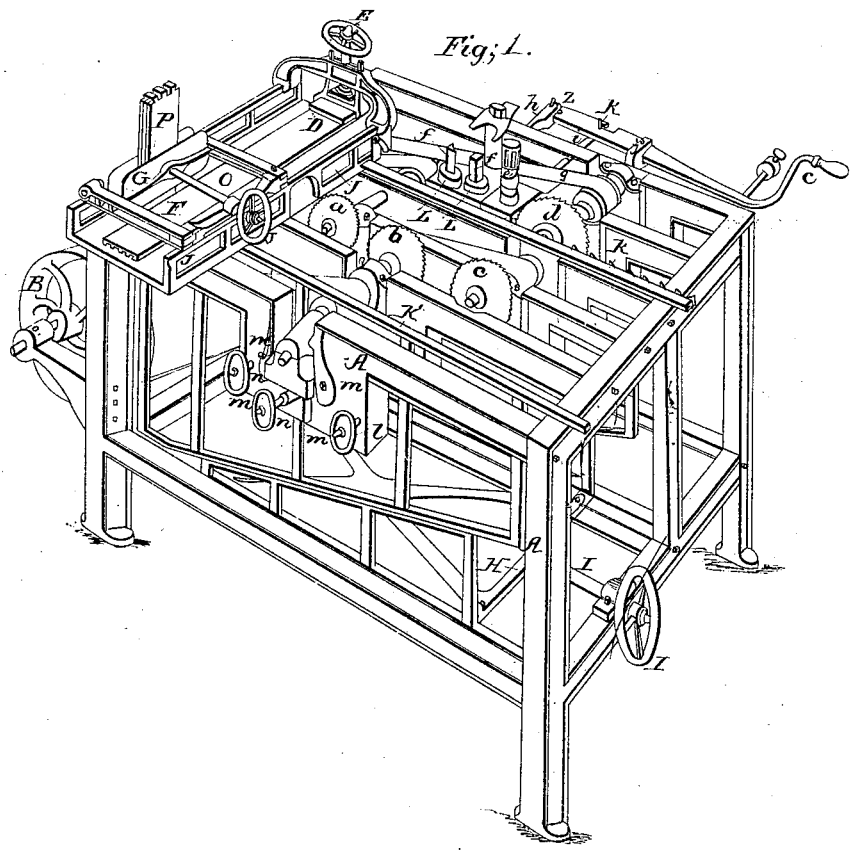

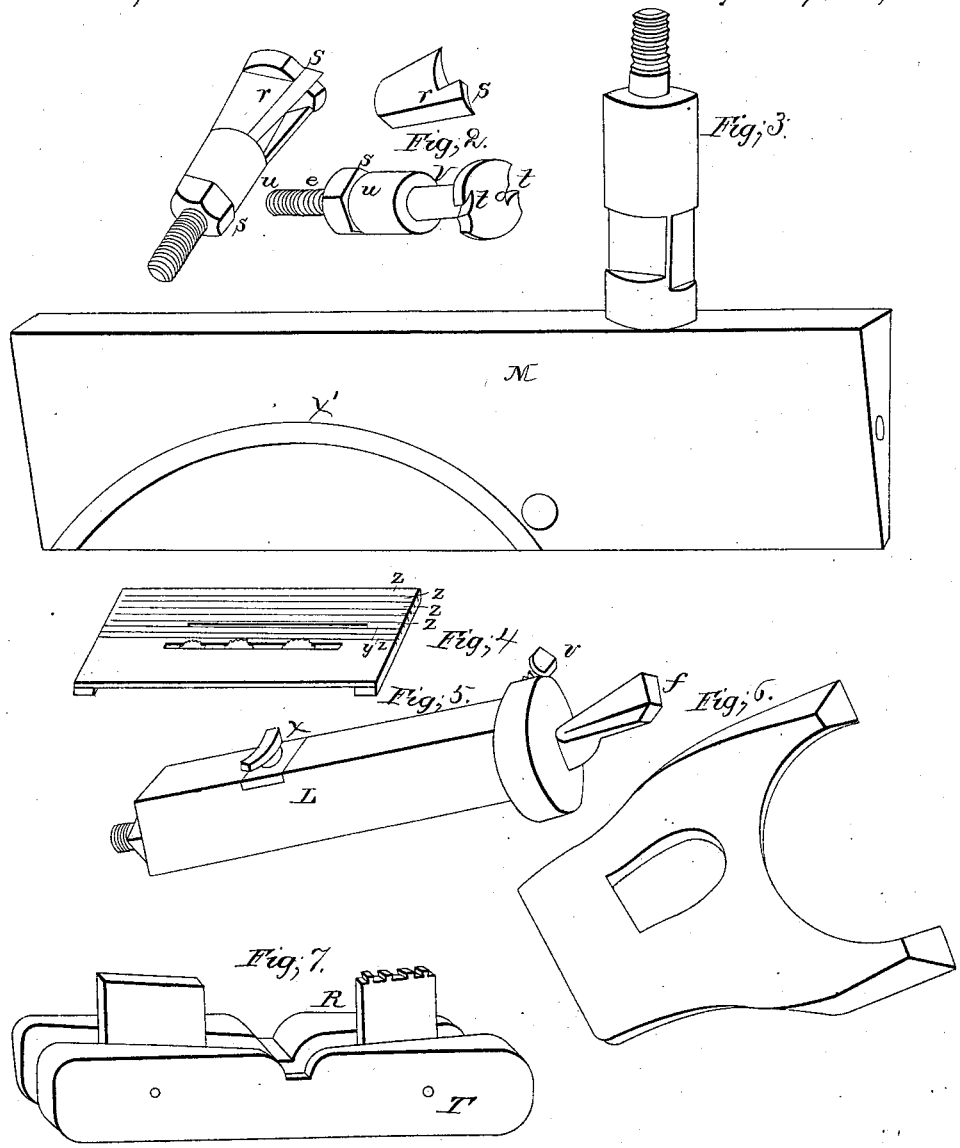

DEDRICK JORDAN, OF CHARLESTOWN, MASSACHUSETTS, AND JOSEPH DILL, OF GRAND RAPIDS, MICHIGAN.

Letters Patent No. 102,011, dated April 19, 1870.

IMPROVEMENT IN DOVETAILING-MACHINE.

The Schedule referred to in these Letters Patent and making part of the same.

*To all whom it may concern:*

Be it known that we, DEDRICK JORDAN, of Charlestown, Massachusetts, and JOSEPH DILL, of the city of Grand Rapids, in the county of Kent and State of Michigan, have invented certain new and useful Improvements in Variety Wood-working Machines; and do hereby declare that the following is a full, clear, and exact description thereof, reference being had to the accompanying drawings and to the letters of reference marked thereon, and the same are made a part of these specifications.

In said drawings—

Figure 1 represents a general view of our invention in perspective;

Figure 2 represents the cutter-head when ready for use, and sectional parts thereof;

Figure 3 exhibits the mechanism by which the vertical and paring-chisels are operated;

Figure 4, a table top and gauge used in the machine;

Figure 5 is a view of one of the vertical chisels, V-shaped, and the socket which holds the same;

Figure 6 shows the paring-chisel, full size; and

Figure 7 shows a block and follower, used in miter-dovetailing.

Like letters represent like parts in the several figures.

Our invention, as its name imports, is designed to accomplish a variety of the work usually performed by manufacturers of furniture, and carpenters and joiners, including dovetailing, both plane and blind, grooving, tonguing, molding, tenoning, and sawing both for slitting and squaring, and to bring the power and machinery necessary to perform the various operations above named within the compass of one machine.

To enable others who are skilled in the art to which the manufacture of our invention appertains to make the same, we will proceed to describe its construction.

The body of the machine is composed of a framework of iron or other suitable material, supported on four legs, as shown in fig. 1.

The power is applied to the machine by means of a band running over the pulley B, which is attached to a shaft extending across the end of the machine, and upon which are suitable pulleys which carry bands that run the mechanism of the invention.

$a$, $b$, and $c$ are circular saws, occupying the positions with reference to each other represented in fig. 1.

The saw $c$ is hung on a horizontal arbor, and is always intended to run in a perpendicular position. This arbor is adjustable longitudinally by means of a regulating-screw working in the bed on which the arbor revolves, and which is operated by the hand-wheel $l$.

The saw $b$ is attached to an arbor, which is adjusted with reference to the other parts of the machine upon an angle; that is, the outer end of this arbor is depressed upon a horizontal line, as compared with the inner end, thus forming an inclined plane, so that the saw $b$ is run upon an angle from the perpendicular, and this angle may be increased or diminished at pleasure.

The position of this arbor, and the consequent angle upon which the saw will run, is regulated and changed by the set-screws $m$ $m$ $m$ $m$. All the saw-arbors in the machine are made adjustable by set-screws similar to these, but they are nowhere else shown.

The arbor upon which the saw $a$ runs is also depressed at the outer end a little from a horizontal line, so that the saw $a$ also runs upon an angle from the perpendicular, but in an opposite direction from the angle of the saw $b$. The extent of this angle may be regulated and changed in the same manner as that of the saw $b$.

Both the saws $a$ and $b$ may be adjusted longitudinally in the same way as the saw $c$, by turning the hand-wheels $n$ $n$.

There is a carriage, J J, which slides along the top of the machine, on the rails K K', and upon this carriage the stock to be operated upon is placed to be worked. In fig. 1 the carriage is represented as being upon the back part of the machine. Its proper and natural position is directly over the working part of the machine.

The rails K K', which support the carriage J J, are placed upon a frame whose bottom rails rest upon a triangular frame beneath it, which is supported in turn by the body of the machine.

This lower frame H H is movable by means of the regulating-screw I, and is used to elevate the frame upon which the rails K K' rest. This is done by forcing the lower frame backward under the upper one, and the upper frame is lowered by a reverse motion.

The carriage J J is furnished with clamps to hold the stock while being operated upon.

The clamp G is adjusted by the regulating-screw O, and holds the stock B in its place while being worked. This clamp slides back and forth sidewise on the carriage, and is guided in its movements by a ratchet, not shown in the drawings. The use of this clamp is confined to stock to be operated upon by the saws already described.

The other clamp, E, is used for that portion of the machine not yet described.

That part of our invention, save the carriage J J, thus far described, is used separately from the remainder of the machine, but both parts aid in the performance of the same general class of work.

That part of our invention not yet described consists of the saw $d$, cutter-head $c$, and chisels $ff$ and $g$, and the mechanism necessary to operate them.

The saw $d$ is hung on a horizontal arbor, propelled by the band $q$, and adjustable longitudinally and otherwise in the same manner as ther arbor on which the saw $a$ runs.

The cutter-head $e$ is in a perpendicular position, and is run by a pulley beneath, not shown in the drawings. It is attached to the arbor operated by the last-named pulley by being screwed into the upper end of it.

In fig. 2 the cutter-head is shown in full size and in sections. It consists of a standard, V, in the form represented, provided with a head, $e$, containing two open slots, $t\ t$, and two knives, one of which is shown by $r$.

The knives are made in the form represented, being larger or wider at the upper end, for the purpose of giving the requisite slant to the dovetail, with a projection, S, upon the cutting-edge, at the upper end, which fits closely into the open slots $t\ t$.

They are held to their places firmly and ready for use by simply forcing the washer $u$ up against them by means of the nut $s$. When put together, the head is attached to the body of the machine, as above described.

The cutter-head, which, with its arbor and pulley is movable, while revolving swiftly is forced against and cuts its way into the stock, to be worked up by carrying the handle of the lever C outward, the lever being pivoted at $j$.

The chisels $ff$ are V-shaped, and have an upward and outward motion when in use. One of them, and the socket L in which it is inserted, is shown, in fig. 5.

The chisel is fastened to the socket by the set-screw V.

In the machine the sockets are placed in a nearly vertical position, one on either side of the wedge-shaped block $m$, fig. 3, and held to their places by the surrounding parts.

The block $m$ is made of iron, in the form represented in fig. 3, and is placed in the machine directly beneath the chisels $ff$ and $g$, fig. 1, and is movable lengthwise in its bed.

Upon each side of it is cut out a circular groove, $x'$, fig. 3.

Into this groove the pivoted tongue which is attached to the socket L, fig. 5, is fitted.

As the sockets L L are placed directly against the sides of the block $m$, the slant of the sides of this block will control and direct the slant or angle of the chisels $ff$ outward as they rise when in use, and the sides of the block should be set upon the same angle, with reference to a perpendicular line, as the angle or slant desired in the dovetail to be made, and it is from the form of this block that the angle of the dovetail to be made is taken, and by which the saws and cutter-head of the machine are set.

$g$, fig. 1, is a paring-chisel, attached by a nut to a standard erected upon and attached to the wedge-shaped block $m$, fig. 3. This chisel is shown in an enlarged form by fig. 6. The two parts of the paring-chisels should be such a distance apart as to enter the dovetails made by the cutter-head and the upright chisels $ff$.

The chisels $ff$ and the paring-chisel $g$ are operated simultaneously by the lever C. As the handle of the lever is carried outward, the wedge-shaped block $m$, fig. 3, is moved inward upon its bed, thus raising the V-chisels $ff$ by means of the curved groove $x'$, fig. 3, and at the same time carrying the paring-chisel $g$ on toward the stock.

The several parts now being described are so adjusted that before the paring-chisel reaches the stock to do its work the part $x$, fig. 5, will begin to descend in the curved groove, thus drawing the chisels $ff$, fig. 1, down, so that they will not interfere with the work of the paring-chisel $g$.

As the paring-chisel is withdrawn by the lever being reversed, the V-chisels are again raised up into the dovetail formed, and then recede to their original and natural position.

If desirable, the paring-chisel may be made V-shaped and the upright chisels flat, instead of in the forms described, but for general purposes we regard the forms given above as preferable.

The lever C is provided with an open slot, $z$, at the end opposite the handle, and this slot, operating upon a pin in the outer end of a rod, $h$, which is attached to the wedge-shaped block $m$, fig. 3, operates the chisels $ff$ and $g$, as above described.

Directly opposite the cutter-head $c$ there is a slot, $k$, in the lever C, with an opening on the outside of the lever.

The lever C is provided with a slot at the fulcrum $j$, extending lengthwise of the lever.

When it is desired to operate the cutter-head instead of the chisels, the workman draws the lever toward him, thus withdrawing it from the rod $h$ altogether and inclosing a pin attached to the rod $i$ in the open slot $k$. The rod $i$ being connected with the cutter-head, the workman will be enabled to operate it with the lever in the manner above described.

The rail K, upon which the carriage J J slides, is in the form of a male dovetail, and enters a corresponding groove in the bed of the carriage; the tendency of the chisels $ff$ to raise the stock when in operation is overcome.

The rail K is provided with a ratchet, which gauges the distance apart of the dovetail.

Fig. 4 represents a table-top provided with an adjustable gauge, $y$, which consists simply of a thin straight firm piece of steel, which fits closely into the grooves $z\ z\ z$ in the table-top.

This table is to be used in connection with the saws $a$, $b$, and $c$, and when in use the carriage J J is removed from the machine.

Fig. 7 represents a block of wood, R, and follower Y, to be attached to the clamp G, for the purpose of making a male dovetail. The block R is bolted to the stationary part of the clamp, and the follower Y to the movable part.

The part R is thickest at the center, and is beveled toward each end upon the same slant and angle of the dovetail desired to be made. The follower is of such form and shape as to make the inner surfaces of these blocks parallel planes.

Having thus described the construction of our invention, we will now proceed to describe its use for the purpose of enabling others familiar with the use of such machinery to operate it.

The sawing, both for slitting and squaring, tongueing, tenoning, molding, and plain grooving, of which our machine is capable, are performed by it in substantially the same manner as the same class of work is done by other machines, and we desire to limit our claim of invention to the specific machine described, together with some of the essential parts thereof, and the manner of making plain and blind dovetails and dovetail grooves, and we will now proceed to describe how these various operations may be performed.

For making male dovetails, the saw C is so set as to take out the spaces between the pins or male dovetails, or if one saw is not thick enough for this purpose, two or more of like size may be fastened upon the same arbor, or a cutter of proper width may be used.

The slant or angle of the dovetail is made by so adjusting the saw $b$ by the use of the adjusting screw turned by the handle $n$, running, as it does, upon an angle from the perpendicular, that, as the stock passes over it on the carriage J J, it will cut away the wood on the right side of the pin, upon the same angle as that upon which the saw is set, and by so adjusting the saw $a$, by means of the hand-wheel $n$, as to cut a like angle on the left side of the pin or male dovetail, and the size of this pin may be such as is desired within the limit of the longitudinal adjustability of the several arbors, and this in common machines is about two inches.

To make a female dovetail, the saw $c$ is set to take out the body of the groove, or, if a wide groove is desired, several saws are used upon the same arbor, or a cutter of the proper width, and the position of the saws $a$ and $b$ is reversed from their position in making male dovetails.

The saw $b$ is so set as to cut the angle of the dovetail on the left side of the groove, and the saw $a$ is so set as to cut the angle on the right side.

In practice, where the dovetail is to be made on the end or side of the stock, as many different pieces may be operated upon at once as can be contained between the jaws of the clamp G, and the uniformity of the dovetails is regulated by the ratchet in the bed of the carriage before described.

When the stock is once properly fixed in the clamp, it is passed and repassed over the saws $a$, $b$, and $c$ as often as may be necessary, until the ends or sides exposed to the action of the saws are finished.

Grooving is done by the saw $a$ alone, or several saws or cutters with it on the same arbor, according to the width of the groove, the saws $b$ and $c$ being removed. For grooving spacing and groove dovetailing, the table-top and gauge shown in fig. 4 may be used to advantage.

After the first groove-space or dovetail is made, the strip of steel $y$ may be so adjusted on the table-top as to fit into it, and thus gauge the next groove-space or dovetail, and so on until all are done. In this manner absolute uniformity in the grooves, &c., may be secured.

The saw $d$, cutter-head $e$, and chisels $ff$ and $g$, are designed more particularly for making blind dovetails. After the stock shown by D has been fastened to the carriage J J by the clamp E, the saw $d$ serves to square it ready for the cutter-head and chisels. As the stock is moved along past the cutter-head $e$, the cutter-head is forced against it at regular intervals, the distance being regulated by the ratchet along the rail K by the lever C.

The cutter-head should revolve at the rate of about six thousand times per minute, and will readily cut its way into the stock when pressed against it by the lever C. The shape of the knives, and their position in the cutter-head, is such as to give the precise angle to the dovetail required.

After the stock has been operated upon by the cutter-head, it is moved along opposite and directly over the V-chisels $ff$, and the uncut inner corners of the dovetail are removed by them, and the paring-chisel $g$ enters the upper surface of the same, cutting away any surplus stock that may be unremoved there.

The chisels $ff$ are at such a distance from each other and from the cutter-head as to enter the dovetails in part made by it, and the two edges of the paring-chisel $g$ enter the stock directly over the chisels $ff$.

An advantage is obtained, on account of having the V-shaped chisels $ff$ cut upward instead of downward, of great importance. The stock is placed on the carriage work-side down, so that the depth of the dovetail will be perfectly uniform, whatever the thickness of the lumber dovetailed. Were the chisels to cut downward, the depth of their cut would depend upon the thickness of the stock, and often be uneven and irregular.

In forming the blind dovetails with the cutter-head and chisels, the work of the cutter-head in the stock is first finished, and then the carriage, having been brought back to its starting position, the work of the chisels is commenced and finished, and the cutter-head and chisels are never operated simultaneously.

This course is rendered necessary by the fact that in making drawer-fronts and many other kinds of work, a projection of wood at the edges is required thicker than the male dovetails or pins, and to avoid cutting into and splitting off these broad projections, as would be done if all the parts operated together, it is necessary to have the cutter-head and chisels operate at different times, and as each of the chisels $ff$, and each edge of the paring-chisel $g$, only cuts on one side of the dovetail, and as the chisels are so arranged that there is one dovetail always between the dovetails being operated upon, the stock may be so adjusted with reference to the action of the chisels that they will not be brought to bear upon the broad projection of wood at all. This result can only be effected by having the paring-chisel supplied with two edges, substantially as represented, and having the V-shaped chisels operated separately, as shown.

We have given above the general use to which the several parts of our invention may be put, and we have not intended to give in detail the various branches of work it is capable of performing. Our design has been to show the general use to which our invention may be put, and the manner in which it is operated.

We disclaim and ask no patent on—

First, the frame which supports the rails K K', and the method of raising and depressing it by means of the triangular frame H H.

Second, the method of sawing, slitting, molding, tonguing, and tenoning on this machine, as the manner of performing these operations is substantially the same as in other machines; but

What we claim to have invented, and desire to secure by Letters Patent, is—

1. The cutter-head $e$, composed of the standard V, head $o$, provided with the open slots $t\ t$, knife $r$, supplied with the projections S, washer $w$, and nut $s$, all constructed and operating in the manner and for the purposes described and set forth.

2. The wedge-shaped block $m$, provided with the curved groove $x'$, the horizontal paring-chisel $g$, having two edges to enter the dovetails cut by the cutter-head $e$, at right angles with the chisels $ff$, in combination with the socket L, provided with the pivoted tongue $x$, (to operate the chisels $ff$,) all arranged and operating substantially in the manner and for the purposes set forth.

3. The lever C, provided with the open slots $z$ and $k$, and the longitudinal slot $j$, when arranged and operating as described.

4. The arrangement of the cutter-head $e$ and chisels $g\ ff$, when constructed as described, and for the purpose specified.

In witness that we claim the foregoing, we have hereunto set our hands and seals this 7th day of December, 1868.

DEDRICK JORDAN. [L. S.]
JOSEPH DILL. [L. S.]

Witnesses:
 OMAR H. SIMONDS,
 EDWARD TAGGART.